US012264706B2

(12) United States Patent
Liu et al.

(10) Patent No.: US 12,264,706 B2
(45) Date of Patent: Apr. 1, 2025

(54) FLOW CONTROL METHOD FOR HIGH-ACCURACY AND HIGH-STIFFNESS HYDROSTATIC DEVICE

(71) Applicant: Haixi (Fujian) Institute,China Academy of Machinery Science&Technology Group, Sanming (CN)

(72) Inventors: Wenzhi Liu, Sanming (CN); Chao Jiang, Sanming (CN); Hong Chen, Sanming (CN); Long Pan, Sanming (CN); Hengfeng Zhu, Sanming (CN); Fuhua Yu, Sanming (CN); Hongrong Lin, Sanming (CN); Xiufang Zheng, Sanming (CN); Jiajing Lin, Sanming (CN); Yuan Gao, Sanming (CN)

(73) Assignee: Haixi (Fujian) Institute, China Academy of Machinery Science&Technology Group, Sanming (CN)

( * ) Notice: Subject to any disclaimer, the term of this patent is extended or adjusted under 35 U.S.C. 154(b) by 0 days.

(21) Appl. No.: 17/922,604

(22) PCT Filed: Apr. 2, 2022

(86) PCT No.: PCT/CN2022/085043
§ 371 (c)(1),
(2) Date: Nov. 1, 2022

(87) PCT Pub. No.: WO2023/115746
PCT Pub. Date: Jun. 29, 2023

(65) Prior Publication Data
US 2024/0384757 A1 Nov. 21, 2024

(30) Foreign Application Priority Data
Dec. 20, 2021 (CN) .......................... 202111564659.6

(51) Int. Cl.
*F16C 32/06* (2006.01)
(52) U.S. Cl.
CPC ................................ *F16C 32/0648* (2013.01)
(58) Field of Classification Search
CPC .................................................. F16C 32/0648
See application file for complete search history.

(56) References Cited

U.S. PATENT DOCUMENTS

| 2,841,372 A | 7/1958 | Phillips |
| 3,118,009 A | 1/1964 | Phillips |

(Continued)

FOREIGN PATENT DOCUMENTS

| CN | 102980755 A | 3/2013 |
| CN | 105424361 A | 3/2016 |

(Continued)

*Primary Examiner* — Phillip A Johnson
(74) *Attorney, Agent, or Firm* — Hemisphere Law, PLLC; Zhigang Ma

(57) ABSTRACT

The present invention relates to a flow control method for a high-accuracy and high-stiffness hydrostatic device, comprising: a main body and an auxiliary body; the upper surface of the main body forms a first flow channel, and a lug boss is formed on the first flow channel; the upper surface of the main body forms a second flow channel; the middle of the main body is concave down to form a pressure stabilizing cavity; the end of the first flow channel is provided with first throttling holes; the second flow channel is provided with a main oil hole; the first flow channel is provided with an oil distribution channel; the lug boss is provided with a second throttling hole; a bump matched with a bearing platform is formed on the bottom of the auxiliary body; a film sheet is arranged between the bump and the bearing platform; and the surface of the bump is provided with a groove. The present invention can complete flow control by a mechanical mode without any control module, and the oil film rigidity is high, which greatly reduces the use cost and (Continued)

improves the use reliability. The present invention has extremely high practicability. The present invention can be applied to relevant devices that need to apply flow control.

3 Claims, 6 Drawing Sheets

(56) References Cited

U.S. PATENT DOCUMENTS

| | | | |
|---|---|---|---|
| 3,477,418 A | 11/1969 | Roosa | |
| 6,076,548 A * | 6/2000 | Schonfeld | ........... F16C 32/0648 |
| | | | 251/50 |
| 6,220,281 B1 * | 4/2001 | Schonfeld | ........... F16C 32/0648 |
| | | | 184/7.3 |

FOREIGN PATENT DOCUMENTS

| | | | | |
|---|---|---|---|---|
| CN | 106641353 A | * | 5/2017 | ............ F16K 17/00 |
| CN | 109595373 A | * | 4/2019 | .......... F16C 32/0648 |
| CN | 209762005 U | * | 12/2019 | |
| CN | 110807277 A | | 2/2020 | |
| CN | 111981171 A | * | 11/2020 | ............. F16K 17/24 |
| CN | 112443577 X | | 3/2021 | |
| CN | 201815876 A | | 5/2021 | |
| GB | 577770 A | | 5/1946 | |

\* cited by examiner

FLOW CONTROL METHOD FOR HIGH-ACCURACY AND HIGH-STIFFNESS HYDROSTATIC DEVICE

TECHNICAL FIELD

The present invention relates to the technical field of flow control of hydrostatic support, and particularly to a flow control method for a high-accuracy and high-stiffness hydrostatic device.

BACKGROUND

Hydrostatic technology is widely used in precision machine tool guides and hydrostatic rotary elements to achieve high motion accuracy requirements. The motion errors of hydrostatic guides and the hydrostatic rotary elements directly affect the surface accuracy of processed parts, and the magnitudes of the motion errors mainly depend on the size of oil film rigidity. The better the oil film rigidity is, the less the film thickness change is when the load changes and the smaller the motion errors of the corresponding guides and rotary elements will be.

The traditional oil supply mode of hydrostatic support mainly adopts a throttle to realize constant pressure oil supply or adopts a multi-head pump to realize quantitative oil supply. The two oil supply modes have defects. When the load changes, a support gap cannot change with the load. If the load becomes larger, and even the gap becomes smaller, the oil film rigidity is poor and is difficult to achieve an expected effect. The improvement of motion accuracy of precision machine tools is greatly limited.

SUMMARY

(I) Technical Problems to be Solved

To solve the above problems in the prior art, the present invention provides a flow control method for a high-accuracy and high-stiffness hydrostatic device.

(II) Technical Solution

To achieve the above purpose, a main technical solution adopted by the present invention comprises:

A flow control method for a high-accuracy and high-stiffness hydrostatic device comprises: a main body and an auxiliary body matched with the main body, wherein the center of the main body is provided with an oil filling hole, a side edge of the main body is provided with an oil outlet hole, and the oil filling hole is communicated with the oil outlet hole; the upper surface of the main body forms a first flow channel, a lug boss is formed on the first flow channel, and the surface of the lug boss is higher than the surface of the first flow channel, so that oil of the first flow channel does not flow to the lug boss; the upper surface of the main body forms a second flow channel; the second flow channel is communicated with the first flow channel, and the surface of the second flow channel is higher than the surface of the first flow channel; the oil of the first flow channel can enter the second flow channel;

The middle of the main body is concave down to form a pressure stabilizing cavity, and the pressure stabilizing cavity and the end surface of the oil filling hole are formed with a throttling platform; the end of the first flow channel is provided with more than one first throttling hole, and the first throttling hole is communicated with the pressure stabilizing cavity, so that the oil enters the pressure stabilizing cavity from the first flow channel; the second flow channel is provided with a main oil hole, and the main oil hole is communicated with the oil outlet hole; the first flow channel is provided with an oil distribution channel; the lug boss is provided with a second throttling hole; the second throttling hole is communicated with the oil distribution channel; and the oil of the oil distribution channel enters the second throttling hole;

A bump matched with a bearing platform is formed on the bottom of the auxiliary body; when the auxiliary body is matched with the main body, the bump is matched with the bearing platform, and a film sheet is arranged between the bump and the bearing platform; the surface of the bump is provided with a groove, and one end of the groove is matched with the second throttling hole; the oil from the second throttling hole enters the groove and then reaches a regulating cavity formed between the film sheet and the bump; the auxiliary body is provided with an oil inlet hole; and when the auxiliary body is matched with the main body, the oil inlet hole is communicated with the first flow channel;

The main body and the auxiliary body are matched to jointly form a flow controller; the closed first flow channel and the second flow channel are formed on a joint end surface of the main body and the auxiliary body; the film sheet is predeformed under the pressure effect of the main body and the auxiliary body to form the regulating cavity and the pressure stabilizing cavity which are not communicated; hydraulic oil enters the flow controller formed by matching the main body and the auxiliary body from the oil inlet hole with pump pressure; after entering, the hydraulic oil is divided into two streams of oil; one stream of oil passes through the first flow channel; and the oil that passes through the first flow channel enters the pressure stabilizing cavity through two first throttling holes respectively, and enters the main oil hole through the second flow channel; the other stream of oil enters the second throttling hole through the oil distribution channel and enters the regulating cavity through the groove; and oil pressure in the regulating cavity deforms the film sheet so that the film sheet is matched with the throttling platform.

Further, the main body is provided with the bearing platform; and the surface of the bearing platform is lower than the surface of the first flow channel for bearing the film sheet.

Further, the groove is helical.

(III) Beneficial Effects

The present invention has the beneficial effects: when the load pressure is changed, the film sheet will be deformed under the action of force; the volume in the pressure stabilizing cavity changes with the deformation of the film sheet, which plays a role of flow control of the oil outlet hole; the greater the load pressure is, the greater the flow is, so that the thickness change of the film sheet is very small. The present invention has higher oil film rigidity, and is conducive to ensure high motion accuracy requirements. The experiment verifies that when the load pressure is changed, the thickness change of the film sheet is less than 2 μm, which meets design requirements.

The present invention can complete flow control by a mechanical mode without any control module, and the oil film rigidity is high, which greatly reduces the use cost and improves the use reliability. The present invention has extremely high practicability. The present invention can be applied to relevant devices that need to apply flow control.

DETAILED DESCRIPTION

Figure 1:
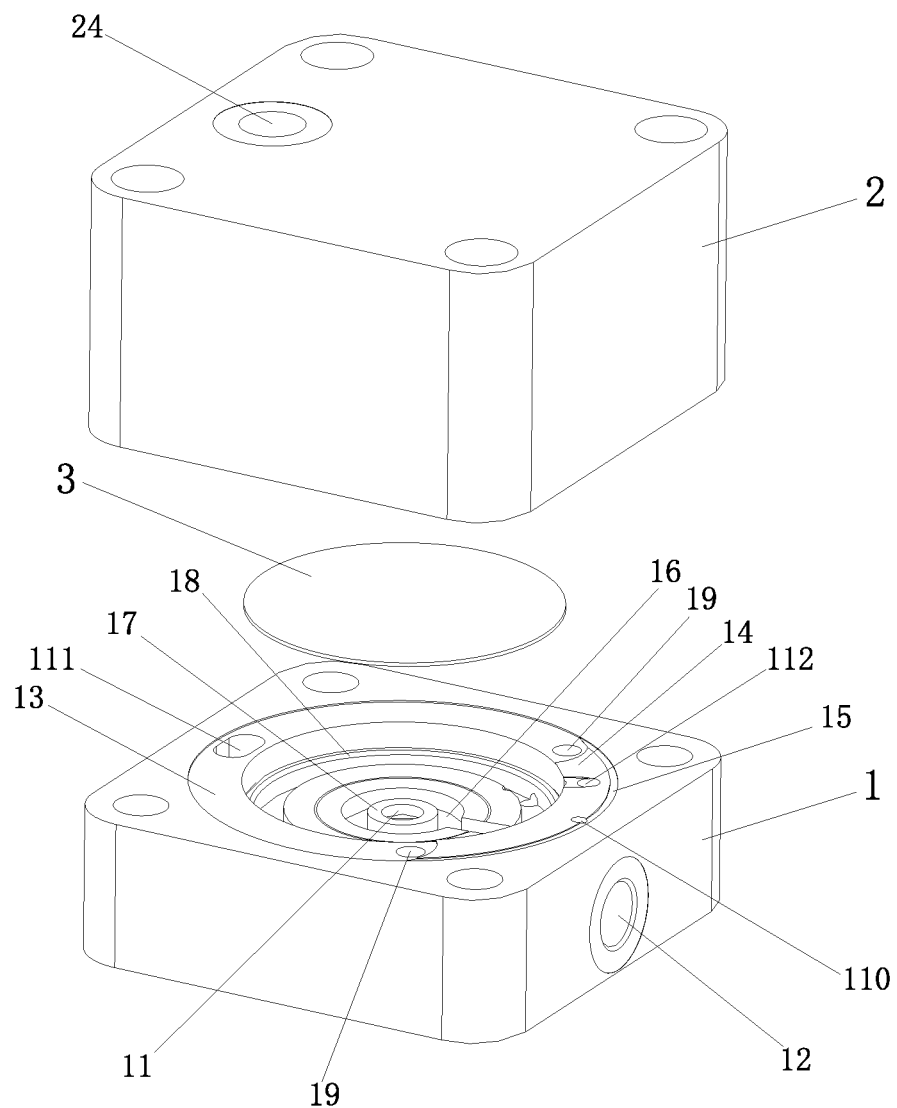
FIG. 1 is a structural exploded diagram of an embodiment of the present invention.

To better explain the present invention to facilitate understanding, the present invention is detailed below in combination with drawings and through specific embodiments.

A flow control method for a high-accuracy and high-stiffness hydrostatic device in an embodiment of the present invention, as shown in FIG. 1-FIG. 6, comprises: a main body 1 and an auxiliary body 2 matched with the main body 1; the center of the main body 1 is provided with an oil filling hole 11, a side edge of the main body 1 is provided with an oil outlet hole 12, and the oil filling hole 11 is communicated with the oil outlet hole 12; the upper surface of the main body 1 forms a first flow channel 13, a lug boss 14 is formed on the first flow channel 13, and the surface of the lug boss 14 is higher than the surface of the first flow channel 13, so that oil of the first flow channel 13 does not flow to the lug boss 14; the upper surface of the main body 1 forms a second flow channel 15; the second flow channel 15 is communicated with the first flow channel 13, and the surface of the second flow channel 15 is higher than the surface of the first flow channel 13; the oil of the first flow channel 13 can enter the second flow channel 15; and after the oil in the first flow channel 13 is full, the oil enters the second flow channel 15.

Specifically, the middle of the main body 1 is concave down to form a pressure stabilizing cavity 16, and the pressure stabilizing cavity 16 and the end surface of the oil filling hole 11 are formed with a throttling platform 17 to prevent the oil in the pressure stabilizing cavity 16 from directly entering the oil filling hole 11.

Specifically, the main body 1 is provided with the bearing platform 18; and the surface of the bearing platform 18 is lower than the surface of the first flow channel 13 for bearing the film sheet 3.

Figure 3:
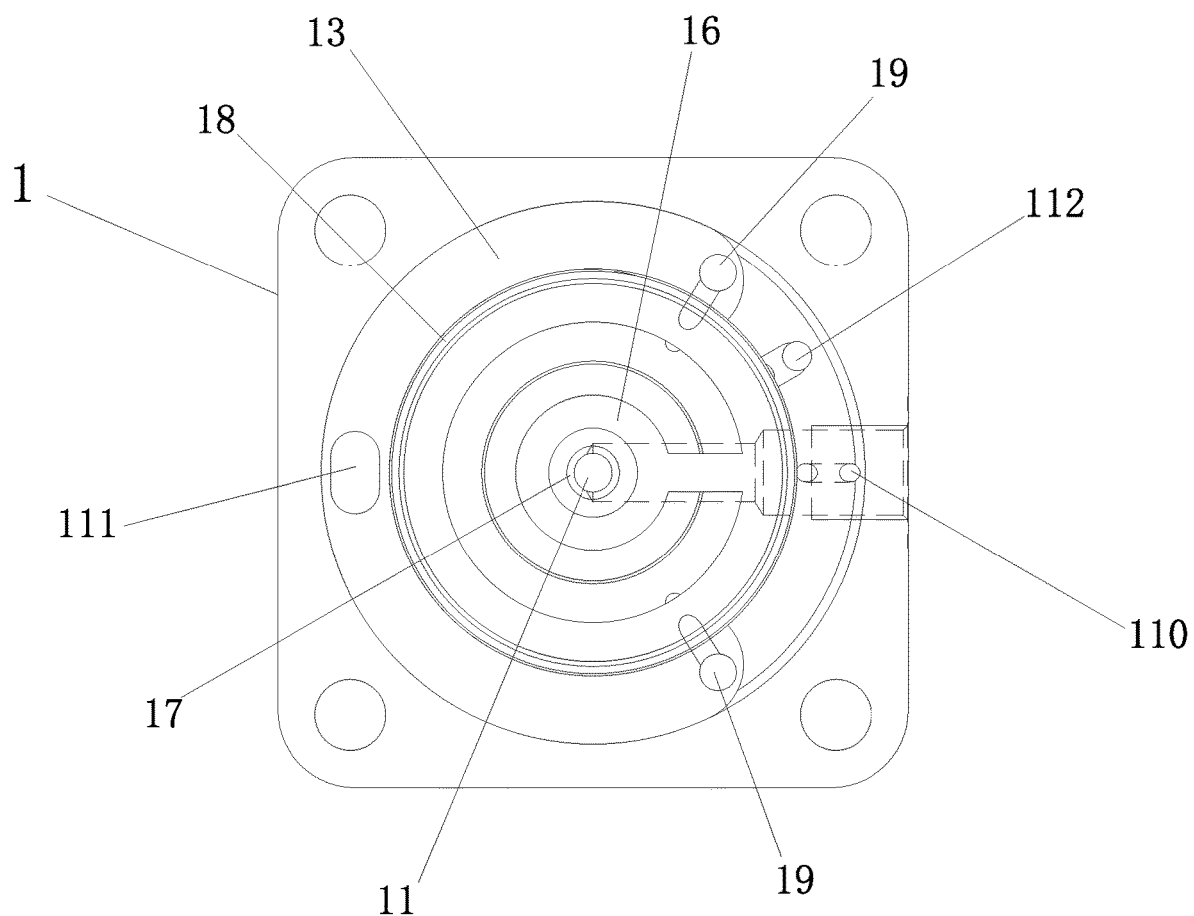
FIG. 3 is a structural top view of a main body of an embodiment of the present invention.
Figure 4:
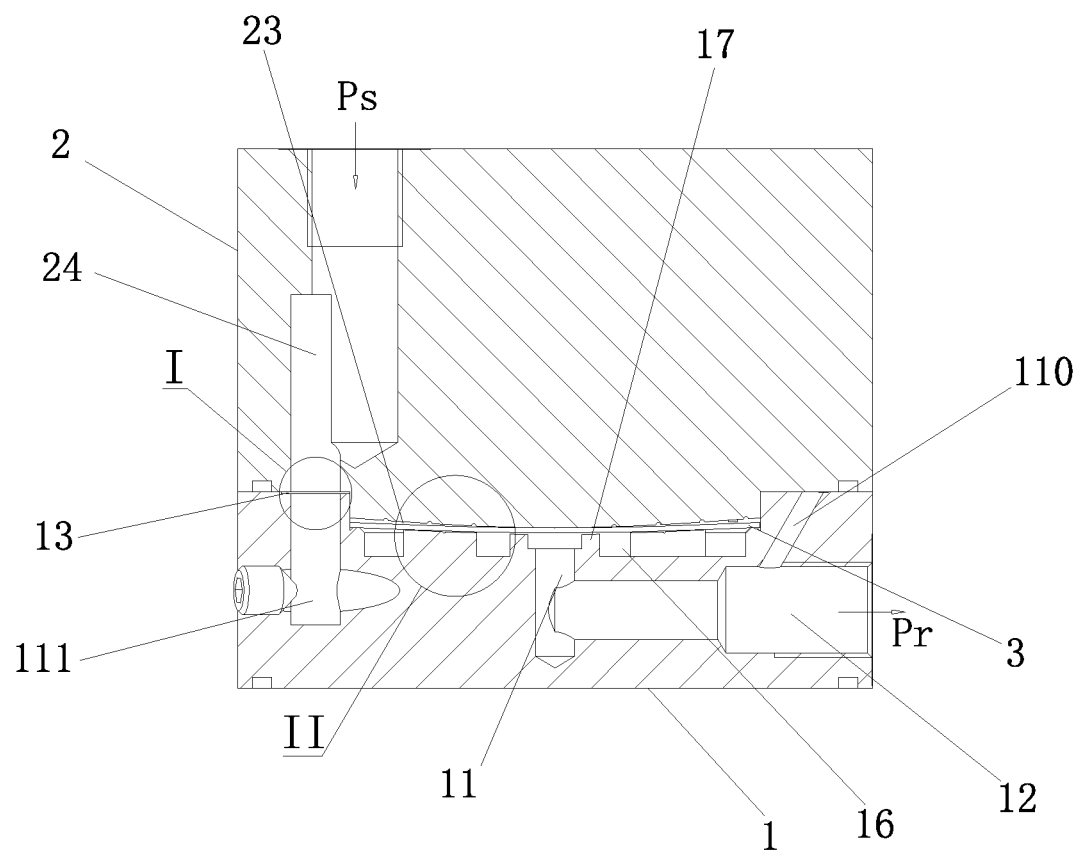
FIG. 4 is a structural sectional view of an embodiment of the present invention.
Figure 5:
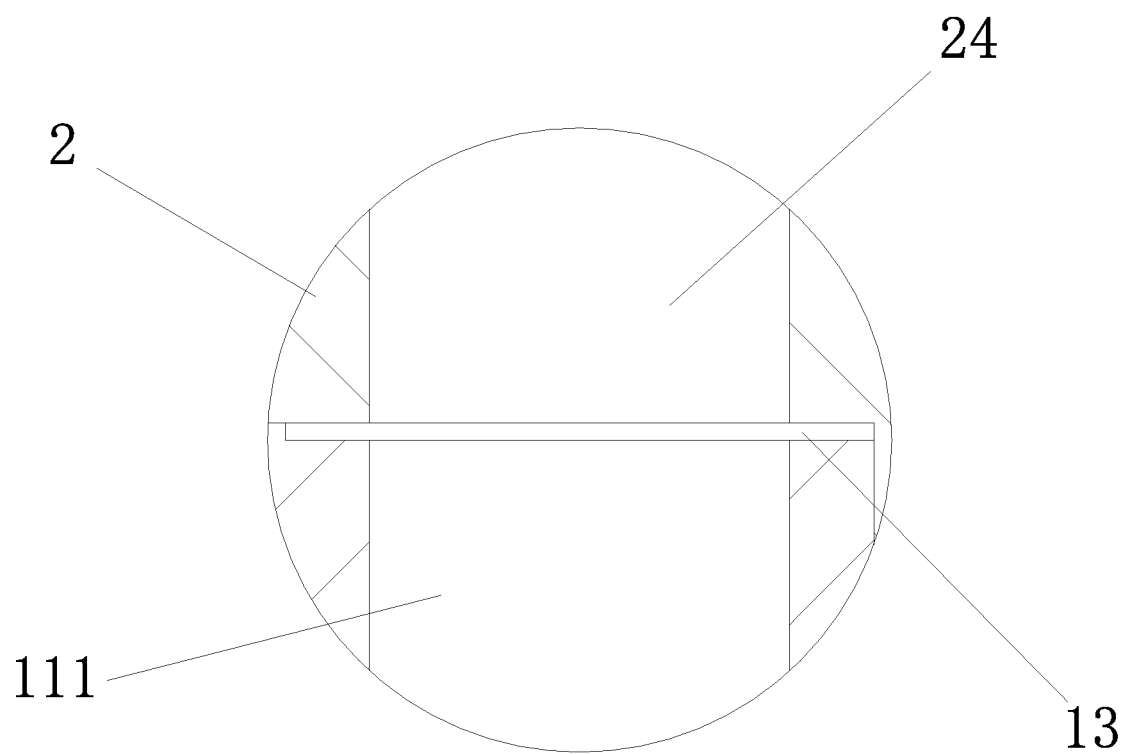
FIG. 5 is a local schematic diagram of I of FIG. 4.
Figure 6:
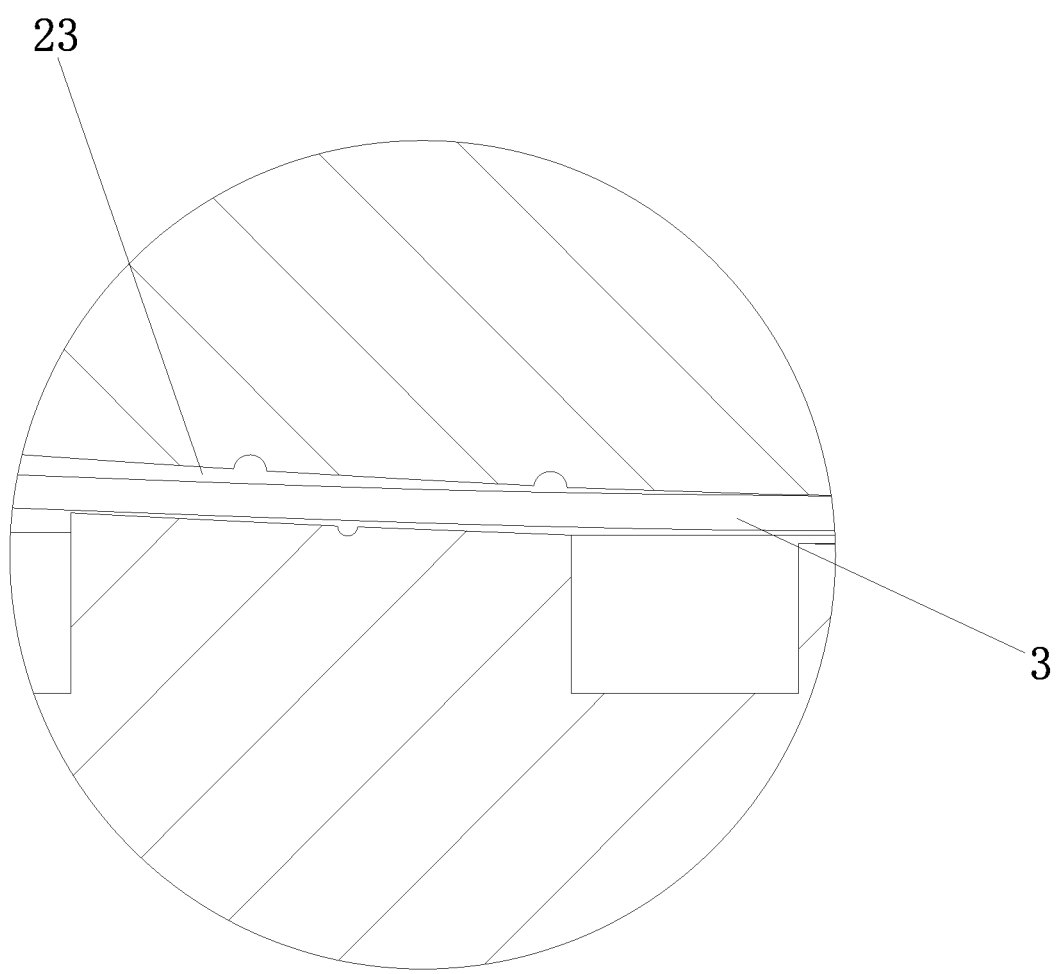
FIG. 6 is a local schematic diagram of II of FIG. 4.

Specifically, as shown in FIG. 3 and FIG. 4, the end of the first flow channel 13 is provided with more than one first throttling hole 19, and the first throttling hole 19 is communicated with the pressure stabilizing cavity 16, so that the oil enters the pressure stabilizing cavity 16 from the first flow channel 13; and the second flow channel 15 is provided with a main oil hole 110, and the main oil hole 110 is communicated with the oil outlet hole 12.

Specifically, the first flow channel 13 is provided with an oil distribution channel 111; the lug boss 14 is provided with a second throttling hole 112; the second throttling hole 112 is communicated with the oil distribution channel 111; and the oil of the oil distribution channel 111 enters the second throttling hole 112.

Figure 2:
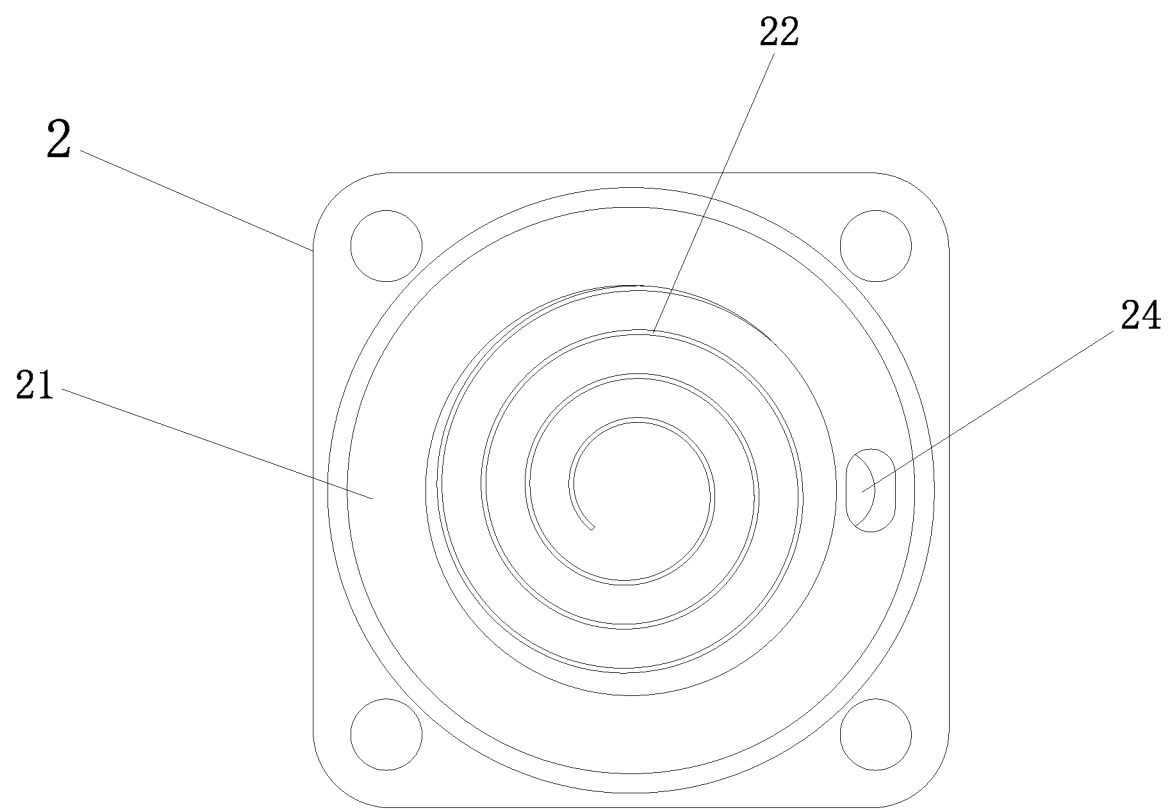
FIG. 2 is a structural bottom view of an auxiliary body of an embodiment of the present invention.

Specifically, as shown in FIG. 2 and FIG. 4, a bump 21 matched with a bearing platform 18 is formed on the bottom of the auxiliary body 2; when the auxiliary body 2 is matched with the main body 1, the bump 21 is matched with the bearing platform 18, and a film sheet 3 is arranged between the bump 21 and the bearing platform 18; the surface of the bump 21 is provided with a groove 22, and one end of the groove 22 is matched with the second throttling hole 112; and the oil from the second throttling hole 112 enters the groove 22 and then reaches a regulating cavity 23 formed between the film sheet 3 and the bump 21.

Specifically, the auxiliary body 2 is provided with an oil inlet hole 24; and when the auxiliary body 2 is matched with the main body 1, the oil inlet hole 24 is communicated with the first flow channel 13 and is located directly above the oil distribution channel 111.

During implementation, the main body 1 and the auxiliary body 2 are matched to jointly form a flow controller; the closed first flow channel 13 and the second flow channel 15 are formed on a joint end surface of the main body 1 and the auxiliary body 2; and the film sheet 3 is predeformed under the pressure effect of the main body 1 and the auxiliary body 2 to form the regulating cavity 23 and the pressure stabilizing cavity 16 which are not communicated. Hydraulic oil enters the flow controller formed by matching the main body 1 and the auxiliary body 2 from the oil inlet hole 24 with pump pressure Ps; after entering, the hydraulic oil is divided into two streams of oil; one stream of oil passes through the first flow channel 13; and the oil that passes through the first flow channel 13 enters the pressure stabilizing cavity 16 through two first throttling holes 19 respectively, and enters the main oil hole 110 through the second flow channel 15; the other stream of oil enters the second throttling hole 112 through the oil distribution channel 111 and enters the regulating cavity 23 through the groove 22; and oil pressure in the regulating cavity 23 deforms the film sheet 3 so that the film sheet 3 is matched with the throttling platform 17.

When no load is connected to the oil outlet hole 12, the pressure Pr of the oil outlet hole 12 is 0, and the oil pressure of the pressure stabilizing cavity 16 is less than the oil pressure of the regulating cavity 23. The film sheet 3 is pressed and then deformed, and bends downward and deforms. The gap between the throttling platform 17 and the film sheet 3 is 0. The oil outlet hole 12 only has hydraulic oil that flows out through the main oil hole 110. At this moment, the flow of the oil outlet hole 12 is minimum.

When the oil outlet hole 12 is connected with a load, the pressure of the pressure stabilizing cavity 16 becomes larger, an original equilibrium state is broken. The film sheet 3 bends upward and deforms. The gap between the throttling platform 17 and the film sheet 3 becomes larger. The hydraulic oil in the pressure stabilizing cavity 16 can flow out of the oil filling hole 11 through the throttling platform 17, and converges with the hydraulic oil in the main oil hole 110, to flow out of the oil outlet hole 12 jointly.

When the load pressure is changed, the film sheet 3 will be deformed under the action of force; the volume in the pressure stabilizing cavity 16 changes with the deformation of the film sheet 3, which plays a role of flow control of the oil outlet hole 12; the greater the load pressure is, the greater the flow is, so that the thickness change of the film sheet 3 is very small. The present invention has higher oil film rigidity, and is conducive to ensure high motion accuracy requirements. The experiment verifies that when the load pressure is changed, the thickness change of the film sheet (3) is less than 2 μm, which meets design requirements.

The present embodiment can complete flow control by a mechanical mode without any control module, and the oil film rigidity is high, which greatly reduces the use cost and improves the use reliability. The present invention has extremely high practicability. The method of the present embodiment can be applied to relevant devices that need to apply flow control.

The above is just one preferred embodiment of the present invention. All equal variations and modifications made in accordance with the scope of the application patent of the present invention shall belong to the scope covered by the present invention.

What is claimed is:

1. A flow control method for a hydrostatic device, comprising: a main body (1) and an auxiliary body (2) matched with the main body (1), wherein the center of the main body (1) is provided with an oil filling hole (11), a side edge of the main body (1) is provided with an oil outlet hole (12), and the oil filling hole (11) is communicated with the oil outlet hole (12); the upper surface of the main body (1) forms a first flow channel (13), a lug boss (14) is formed on the first flow channel (13), and the surface of the lug boss (14) is higher than the surface of the first flow channel (13), so that oil of the first flow channel (13) does not flow to the lug boss (14); the upper surface of the main body (1) forms a second flow channel (15); the second flow channel (15) is communicated with the first flow channel (13), and the surface of the second flow channel (15) is higher than the surface of the first flow channel (13); the oil of the first flow channel (13) can enter the second flow channel (15);

the middle of the main body (1) is concave down to form a pressure stabilizing cavity (16), and the pressure stabilizing cavity (16) and the end surface of the oil filling hole (11) are formed with a throttling platform (17); the end of the first flow channel (13) is provided with more than one first throttling hole (19), and the more than one first throttling hole (19) is communicated with the pressure stabilizing cavity (16), so that the oil enters the pressure stabilizing cavity (16) from the first flow channel (13); the second flow channel (15) is provided with a main oil hole (110), and the main oil hole (110) is communicated with the oil outlet hole (12); the first flow channel (13) is provided with an oil distribution channel (111); the lug boss (14) is provided with a second throttling hole (112); the second throttling hole (112) is communicated with the oil distribution channel (111); and the oil of the oil distribution channel (111) enters the second throttling hole (112);

a bump (21) matched with a bearing platform (18) is formed on the bottom of the auxiliary body (2); when the auxiliary body (2) is matched with the main body (1), the bump (21) is matched with the bearing platform (18), and a film sheet (3) is arranged between the bump (21) and the bearing platform (18); the surface of the bump (21) is provided with a groove (22), and one end of the groove (22) is matched with the second throttling hole (112); the oil from the second throttling hole (112) enters the groove (22) and then reaches a regulating cavity (23) formed between the film sheet (3) and the bump (21); the auxiliary body (2) is provided with an oil inlet hole (24); and when the auxiliary body (2) is matched with the main body (1), the oil inlet hole (24) is communicated with the first flow channel (13);

the main body (1) and the auxiliary body (2) are matched to jointly form a flow controller; the closed first flow channel (13) and the second flow channel (15) are formed on a joint end surface of the main body (1) and the auxiliary body (2); the film sheet (3) is predeformed under the pressure effect of the main body (1) and the auxiliary body (2) to form the regulating cavity (23) and the pressure stabilizing cavity (16) that are not communicated with each other; hydraulic oil enters the flow controller formed by matching the main body (1) and the auxiliary body (2) from the oil inlet hole (24) with pump pressure; after entering, the hydraulic oil is divided into two streams of oil; one stream of oil passes through the first flow channel (13); and wherein the more than one first hole comprising two first holes and the one steam of the oil that passes through the first flow channel (13) enters the pressure stabilizing cavity (16) through the two first throttling holes (19) respectively, and enters the main oil hole (110) through the second flow channel (15); the other stream of oil enters the second throttling hole (112) through the oil distribution channel (111) and enters the regulating cavity (23) through the groove (22); and oil pressure in the regulating cavity (23) deforms the film sheet (3) so that the film sheet (3) is matched with the throttling platform (17).

2. The flow control method for the hydrostatic device according to claim 1, wherein the main body (1) is provided with the bearing platform (18); and the surface of the bearing platform (18) is lower than the surface of the first flow channel (13) for bearing the film sheet (3).

3. The flow control method for the hydrostatic device according to claim 1, wherein the groove (22) is helical.

* * * * *